3,484,243
LIQUID ANIMAL FEED COMPOSITIONS AND PROCESS FOR PREPARING SAME
Philip Carlton Anderson and Janet Lorraine Cooper Rapp, Crete, Nebr., assignors to Feed Service Corporation, Crete, Nebr., a corporation of Nebraska
No Drawing. Filed July 7, 1966, Ser. No. 567,034
Int. Cl. A23k 1/16
U.S. Cl. 99—2     15 Claims

ABSTRACT OF THE DISCLOSURE

The addition of from about 1 to about 12 percent, by weight, of n-propyl alcohol, to liquid animal feed supplements, has been found to contribute to the maximal amount of food for eventual human consumption. The supplements may contain sugars, edible gums, molasses, urea and ethyl alcohol.

---

Our present invention relates to a novel, liquid feed supplement for animals, and to a process for preparing the novel supplement.

More especially, the present invention has particular application to such supplements which while useful for animals in general, are especially intended for use by ruminants, such as cattle, sheep, camels, goats, bisons and others. For purposes of illustrating our invention, it will be specifically exemplified in connection with its particular application to cattle.

Production of ruminants is measured in terms of meat or milk production. To accomplish either process efficiently, elements must be supplied nutritively in proper proportion to meet requirements for synthesizing new tissue. Beyond this, a certain amount of energy must be expended in basal metabolism. Most simply, carbohydrate, fat or protein is oxidized to release energy with carbon and hydrogen ultimately serving as oxygen acceptors. Nitrogen does not accept oxygen in mammalian respiration. Energy, indeed, must be expended to convert consumed nitrogen, not used in tissue building, to urea, the principal nitrogenous waste product of mammals.

The four elements comprising 97 percent of the nutritive requirements of ruminants are carbon, hydrogen, oxygen and nitrogen. Of these, hydrogen is most likely to be the limiting element for efficient ruminant production.

One object of this invention is to devise a hydrogen supplement to effect a proper proportion of carbon, hydrogen, oxygen and nitrogen in ruminant nutrition, so that the maximum amount of tissue containing potential energy for human consumption can be built with minimum amount of carbon, hydrogen or nitrogen wasted, beyond the carbon and hydrogen required for basal metabolism of the animal.

Another object of this invention is to provide a novel feed supplement substance which will supply the limiting element hydrogen without contributing additional nitrogen which might already be excessive in the diet.

We have previously suggested that ethanol has value as an ingredient in feed supplements, as a synergistic for urea and other sources of synthetic nitrogen, in order to increase the nitrogen-retention ability of the ruminants. While this suggestion, culminating in U.S. Patent No. 2,808,332, has found extensive, commercial acceptance in many parts of the world, it is, nevertheless, the fact that ethanol, by itself, is not suitable for the purposes of this invention. Among other considerations, the use of ethanol is certainly not indicated where protein nitrogen is already amply represented in the ration of the ruminant.

We have found, surprisingly, that the normal propyl alcohol of commerce, when incorporated, in small amounts in liquid feed supplements, admirably serves the purposes of this invention, enabling us to attain the foregoing objects, and others. We believe that the previously-unrecognized properties of normal propyl alcohol are such as to enable it to act as a safe source of hydrogen in the ration of the animal and thereby to constitute the formation of the maximal amount of meat, milk and other food products suitable for eventual human consumption.

It was, of course, surprising that normal propyl alcohol, a substance long believed to be toxic is, in fact, suitable for use in animal feed supplements. While no supporting evidence for the foregoing statement is believed to be needed, nevertheless, data from two authoritative sources are given below:

(1) Webster's dictionary defines normal propyl alcohol as follows:

"An acrid oily liquid, of unpleasant odor, accompanying many raw or insufficiently distilled alcohol liquors, (as potato whiskey or corn whiskey, etc.), as an undesirable ingredient."

(2) The booklet on alcohols published by Union Carbide Corporation and last copyrighted in 1965 shows that n-propyl alcohol is at least as toxic as practically all of the alcohols listed, having an $LD_{50}$ over 6 times greater than that of the recognized poison, methanol.

Nor is the only unexpected aspect of the finding of this invention the fact that n-propyl alcohol is suitable for use as an ingredient in animal feed supplements. It has also been found that feedstuffs such as grain, hay, silage and added minerals and molasses, resist staleness and molding longer when from .05% to .5% normal propyl alcohol has been added thereto, on a dry matter basis, as a component of an admixed liquid feed supplement. This finding permits feeders to prepare larger batches of formulated rations over longer intervals of time while still maintaining fresh, palatable, quality rations.

In carrying out the present invention, n-propyl alcohol is incorporated into a ruminant feed supplement by mixing it with other substances which are also nutritionally advantageous to the ruminant and its symbiotic microflora, the whole mixture having certain physical characteristics which are advantageous to the feeder as well. It is preferred, for example, to provide liquid animal feed supplements which, in addition to n-propyl alcohol, contain an edible sugar, i.e., pentoses and hexoses; certain edible gums; ionizable compounds naturally occurring in molasses; and water. If desired, other nutritious substances, such as ethyl alcohol, urea, phosphoric acid, so-called trace minerals, vitamins, and the like, may also be employed in our novel liquid feed supplements.

The novel liquid supplements are conveniently prepared by conventional mixing techniques. Care should be exercised to avoid adding the gums to the n-propyl alcohol and ionizable compounds while the latter two components are in concentrated form, in order to avoid undesirable precipitates.

In use, our novel liquid feed supplements may be used in any suitable manner. Thus, for example, they can be fed, free choice, with conventional co-fed rations of solid feedstuffs such as those mentioned above. Preferably, the liquid supplement is presented to the animals in a feeding device so designed as to permit the animals to lick, not drink, the supplement, a little at a time, many times a day. One such feeder, is a ball point feeder described in co-pending U.S. patent application, Ser. No. 447,620, filed Apr. 13, 1965, now U.S. Pat. No. 3,303,824, by one of us and another. The animal liquid feeder described in application, Ser. No. 447,620 comprises a liquid feed tank; a removable filter plug cap removably mounted in said tank to permit introduction of liquid feed into said tank; undirectional gas delivery means including a source of gas under pressure and gas pressure regulating and flow control means communicating with the interior of said tank through a tube that is open at a point near the bottom of the tank to place the liquid feed therein under controlled pressure; liquid feed supply means including a tube extending from a point near the bottom of the tank level with that of the open part of the gas delivery tube to the exterior of said tank and terminating in a pair of spaced feed ball valve dispensing units, each at the level of the top of said tank; each of said units comprising a cavity in communication with the interior of said tank through said feed supply tube that is formed partially by a lower wall having a circular opening therein normally closed by a slightly retractable rotatably mounted round feed ball of a diameter slightly larger than that of said opening that is disposed in said cavity, rests on said lower wall and has a portion projecting downwardly through said opening in position to be licked by an animal to retract slightly said feed ball to permit some liquid feed under pressure to be dispensed.

We have found that although concentrated water-miscible alcohols have the undesirable property of denaturing protein on the animals' tongues, the novel supplements of this invention do not have this adverse effect. To establish the safety of our supplements in this regard we have devised and adapted an egg white test, based on the well recognized property of egg white to exhibit reactions of protein systems. The test is conducted as follows: Ten fresh eggs are separately opened and the whites carefully collected in a graduated cylinder, the yolks being discarded. After gently stirring, the egg white is distributed in open Petrie dishes, 25 ml. per dish. Five ml. of the solution to be tested is floated on the surface of the egg white and the dish is gently swirled. Any damage to the egg white (precipitation, coagulation, and/or denaturation) can be easily viewed as an opaque whitening of the egg white.

Our novel supplements do not cause any such precipitation, etc., of the egg white.

If desired, the liquid supplements of this invention may be admixed directly with solid feedstuffs, such as grain, and then fed to the animals.

In view of the varied conditions under which our present invention may be utilized, it is not possible to set forth, with the desired exactitude and certainty, the proportions in which the various feed components may be employed. This will be appreciated when one considers that the n-propyl alcohol may be incorporated with varying other components, the different ways novel liquid feed supplement may be used, etc. In spite of the factors mentioned, and others, the practical utilization of this invention is easy of attainment.

In general, we have found that normal propyl alcohol is advantageously employed in amounts from about 1 to about 12 percent of the liquid supplement. All "percents" stated in the specification and claims herein are given by weight and based on the total weight of the liquid supplement. Amounts of n-propyl alcohol between about 6 and 8 percent, on the same basis, are presently preferred.

The edible sugars employed in accordance with this invention include arabinose, xylose, glucose, fructose, sucrose, maltose and lactose. The sugars may be used alone, or a plurality of them may be used. Amounts of sugars from about 20 to about 70 percent, give satisfactory results. We now prefer to use amounts from about 30 to about 40 percent, since these amounts result in supplements which have desired adhesion. We have found that such supplements form a visible and uninterrupted film on an ordinary glass rod when dipped in the supplement at 120° F.

Supplements which contain substantially less than 20 percent of sugars are often refused by the animals when presented in feeders of the aforesaid ball point type, perhaps because of inadequate palatability. Such low sugar supplements, when presented admixed with solid co-fed materials such as grains and forages, are liable in some cases not to adhere uniformly to the surfaces of the co-fed materials, nor to spread well in the mix.

Supplements which contain substantially more than 70 percent of edible sugars are not desired in some cases because of insufficient fluidity.

The edible gums useful in accordance with this invention include at least one edible gum selected from the group consisting of algin, amylopectin, arabic, carboxymethyl cellulose, dextran, dextrin, ethylhydroxyethyl cellulose, guar, karaya, methyl cellulose, methyl cellulose derivatives, pectin and carrageenan. The term "methyl cellulose derivatives" refers to modified D-glucoglycans. Substituents include ethyl, hydroxyethyl, hydroxypropyl and carboxymethyl ether groups.

Amounts of gum from about ¼ to about 8 percent are useful. We now prefer to use from about 1 to about 2 percent. The use of the gums is desirable for, among other things, they impart suitable viscosity to the supplement, ranging from a minimum of about 10 centipoises at 120° F. to a maximum of about 1,000 centipoises at 32° F.

The ionizable compounds useful in accordance with this invention are the edible and water soluble mineral compounds, amino acids and other organic acids naturally occurring in molasses. Such compounds are amino acids; the sulfates, sulfites, chlorides, silicates and phosphates of potassium, sodium, calcium and magnesium; and the formates, acetates, propionates, citrates, pyruvates; and acids of the citric acid cycle.

The ionizable compounds are used in amounts sufficient to yield a supplement having a pH of between about 2.5 and 5.5, a pH of about 4.0 being preferred. Supplements having the desired pH are characterized by optimal palatability and maximal resistance to microbial and insectile attack prior to use.

It has been found that amounts of ionizable compounds from about 0.5 to about 50 percent have been found to be useful. We now prefer to use from about 20 to about 30 percent.

Water is advantageous in the novel liquid supplements of this invention, for practical reasons, among which are to permit the securing of suitable viscosity, adhesion and pH. Amounts of water from about 25 to about 50 percent are generally useful, amounts from about 30 to about 35 percent being preferred by us at this time.

If desired, the preferred liquid feed supplements of this invention may also contain other ingredients employed in animal feeds. Thus, for example, ethyl alcohol, with or without animal-tolerated denaturants, can be used. One such suitable denatured ethanol is Formula SDA35A (Alcohol and Tobacco Tax Division, Internal Revenue Service, U.S. Treasury Dept.). We have found that amounts of ethanol, up to 22 percent of the liquid supplement, can be used. Within this upper limit, it has been found that when ethanol is used, a good working rule is to use up to 2 parts by weight to replace or reduce 1 part of n-propyl alcohol or 1 part of water.

Similarly, urea or other sources of synthetic nitrogen may be used in the liquid supplements of this invention. It has been found that up to 20 percent of urea may be incorporated in the supplement, the preferred amount being around 5 percent.

When ethanol and urea, or other synthetic source of nitrogen are both used, it is preferred to use them in the relative proportions set forth in our U.S. Patent No. 2,808,332.

Other conventional additives, such as phosphoric acid, vitamins, trace elements and hormones, may also be used, in conventional manner and amounts.

It is to be understood that in certain cases it is possible to employ one ingredient to contribute a plurality of the individual above-named components. Thus, for example, different kinds of molasses may be used, alone or in combination, to contribute part of the above-indicated requirements of sugar, gum, ionizable agent and/or water. Since each batch of molasses varies as to composition and since the various kinds of molasses, made from different natural products, vary in composition also, it is not possible to state any definitive rule for determining a formulation to be used with a particular batch of particular molasses. However, with available knowledge as to the composition of the various kinds of molasses (e.g., corn, cane, citrus, wood or beet), and following the teachings herein, one skilled in the art will be able to practice this invention.

In using our novel feed supplements, we have found it advisable to employ minimal amounts of n-propyl alcohol in feeding animals initially and gradually increasing the n-propyl alcohol content over a period, generally, of 2 to 3 days. This is so because it has been our experience that cattle initially do not eat the supplement in adequate amounts. We believe that the reason for the initial reaction of the animals is that the microbial life in the rumen initially has a low capacity to metabolize the n-propyl alcohol.

We give below a number of illustrative examples to show the practice of our invention. In all cases, the compositions were presented to the animals as indicated above except as otherwise stated in the examples. In all cases, as more fully stated in some of the examples, the animals showed marked weight gains and, in the case of milk producing cattle, substantial increases in milk production, when fed the liquid supplements of this invention.

EXAMPLE 1

A liquid feed supplement was made with the following composition:

| | Percent |
|---|---|
| Normal propyl alcohol | 1 |
| Water | 50 |
| Sucrose | 43.75 |
| Carboxymethyl cellulose (Hercules Type 7LP) (Hercules Powder Company, Wilmington, Del.) | .25 |
| Monosodium phosphate, (NaH$_2$PO$_4$) | 5 |

This liquid was almost clear, slightly viscous and had a preferred pH of 4.2. The viscosity was 38.4 centipoises at 120° F. A moderately low amount of inorganic mineral pH buffering substance, (NaH$_2$PO$_4$), was included. The adhesion at 120° F. to a glass rod was satisfactory.

EXAMPLE 2

A liquid feed supplement was made with the following composition:

| | Percent |
|---|---|
| Normal propyl alcohol | 1 |
| Water | 34 |
| Cane molasses (Central Mercedita, Puerto Rico, 24.5% water, 50% sugars, 3% dextran gum, 20% dissolved ionizable substances, 2.5% non-ionizable other substances) | 64.5 |
| Monosodium phosphate | .5 |
| | 100 |

This liquid substance had a pH of 5.2, a viscosity of 88.9 centipoises at room temperature, good adhesion at 120° F. and had a light brown color.

EXAMPLE 3

A liquid feed supplement was prepared as follows:

| | Percent |
|---|---|
| Normal propyl alcohol | 7.0 |
| Water | 25 |
| Glucose | 67 |
| Carboxymethyl cellulose (Hercules 7-LP) | .25 |
| Phosphoric acid (75%) | .50 |
| Monosodium phosphate | .25 |

The mixture was a light amber, almost clear color, with a viscosity of 775 centipoises at 78° F. and a pH of 2.5.

EXAMPLE 4

A feed supplement was prepared to contain as follows:

| | Percent |
|---|---|
| Normal propyl alcohol | 12 |
| Water | 50 |
| Sucrose | 25 |
| Viscidizing agent | 2 |
| Acidulating agent | 11 |
| | 100 |

This supplement was prepared by admixing wood molasses, water, and normal propyl alcohol. The pH of the supplement was 4.5.

| | Percent |
|---|---|
| Wood molasses (Masonex Corp.) | 50 |
| Normal propyl alcohol | 12 |
| Water | 31 |
| Monosodium phosphate | 7 |
| | 100 |

The wood molasses contained 38% water, 4% gums, 50% sugar, 8% minerals and other ionizable nutrients, and less than one percent of other substances. The pH of the supplement was 4.5.

EXAMPLE 5

A feed supplement for ruminants was prepared as follows:

| | Percent |
|---|---|
| Normal propyl alcohol | 6 |
| Specially denatured alcohol #35A | 6 |
| Water | 16⅔ |
| Sodium chloride | 1⅔ |
| 75% phosphoric acid | 3 |
| Molasses, 84° Brix (Colonial Molasses Company) | 66⅔ |
| | 100 |

The molasses contained 3.0 dextran, 20% water, 20% inorganic minerals and other ionizable substance, 3% unidentified fraction and 54% sugars. The pH of this supplement was 3.5, the viscosity was 469 centipoises at 32° F., the freezing point was −30° F., the color was olive brown, and the adhesive properties as determined by observing its adherence to a glass rod at 120° F. were quite satisfactory. This supplement, called Supplement H, was not flammable under Interstate Commerce Commission regulations. The taste was very pleasant with a faint alcoholic molasses flavor.

Thereafter, a comparative feeding trial was arranged using the following dairy herd: a herd of 30 cows of Holstein extraction, consuming a ration having 2.4% nitrogen on a dry matter basis and producing an average of 54 pounds of milk per cow per day. Included in the ration of these 30 cows was a liquid feed supplement, assigned the name Supplement M, and containing the following:

| | Percent |
|---|---|
| Ethanol | 5.7 |
| Ethyl acetate | .3 |
| Urea | 10 |
| Molasses solids | 50 |
| Phosphoric acid | 3 |
| Trace elements and water of solution | 31 |
| | 100 |

The thirty animals, on Feb. 1, 1966, were divided into two groups of 15 cows each. The first group were called Supplement M cows and continued to receive the same ration containing Supplement M. The second group were called Supplement H cows and were given the same ration except that Supplement M was deleted and Supplement H was mixed with the grain fraction of the ration so that each cow received one half pound of the described composition with her grain at each of the two daily feedings.

Within two days, the production of milk by the H cows was increased by two pounds per head per day over that of the M cows, whose production remained essentially constant.

After four weeks, the new supplement was discontinued. The production of milk by the H cows immediately dropped 3.5 pounds per cow per day, to a level of about 1.5 pounds below the M cows.

Five days later, feeding of the Supplement H was reintroduced, at the original rate and in the original manner. Production of milk again increased by 3.5 pounds per H cow per day, about 2.0 pounds above the M cows.

Blood samples were drawn from three animals of each of the two groups, H and M. No trace of ethanol or of normal propyl alcohol was found in the blood from either group. Urea levels were similar in both groups. Clinical tests were as follows:

Table #1 represents clinical blood studies to determine any differences between the cattle consuming normal propyl alcohol and the control animals consuming a similar ration without normal propyl alcohol.

TABLE #1.—LABORATORY REPORTS

[#1, 2, and 3 represent H cows and #7, 8 and 9 represent M cows]

| Hematology | Group H Cows | | | Group M Cows | | |
| --- | --- | --- | --- | --- | --- | --- |
| Hemoglobin, gms | 13.1 | 12.30 | 11.30 | 13.1 | 12.0 | 12.65 |
| Hemoglobin, percent R.B.C | 85 | 79 | 72 | 85 | 77 | 82 |
| Hematocrit, mm | 36 | 36 | 32 | 37 | 34 | 38 |
| W.B.C | 8,350 | 6,750 | 8,000 | 7,000 | 7,450 | 5,350 |
| Diff.: Segs., percent | 19 | 9 | 11 | 21 | 7 | 4 |
| Lymphs, percent | 79 | 89 | 85 | 66 | 93 | 93 |
| Monos, percent | | | | | | |
| Eosins, percent | 2 | 2 | 4 | 3 | | 3 |
| Basos, percent | | | | | | |
| Platelets, No./cu. mm | | | | | | |
| Sed. Rate, C.R.P. Test | 1-2-3 OMM/hr. | | | 7-8-9 OMM/hr. | | |

| Blood Chemistry | Normal | Group H Cows | | | Group M Cows | | |
| --- | --- | --- | --- | --- | --- | --- | --- |
| | | #1 | #2 | #3 | #7 | #8 | #9 |
| Urea Nitrogen, mg. percent | 9-15 | 12.0 | 10.8 | 12.0 | 13.2 | 12.8 | 11.5 |

Under conditions of this study, normal propyl alcohol was demonstrated to be non-toxic and more desirable than urea as an additive to the ration.

EXAMPLE 6

As an example of results which can be expected from this new supplement, as formulated according to Example 5, a comparison was conducted between two groups of bull calves fed identical rations, each with a liquid supplement, ad libitum, fed in a feeder as described in the U.S. co-pending application Ser. No. 540,553, except that the normal propyl alcohol in Supplement H (Example 5) was replaced with a like amount of water. There were five head of cattle in each lot.

The feeding program was continued for sixty days. The results are tabulated as follows:

| | Supplement H with normal proply alcohol | Supplement without normal propyl alcohol |
| --- | --- | --- |
| Final weight of 5 head | 2,770 | 2,720 |
| Initial weight of 5 head | 1,644 | 1,675 |
| Total gain of 5 head | 1,126 | 1,045 |
| Average gain per head per period | 225 | 209 |
| Average gain per head per day | 3.46 | 3.20 |
| Average feed consumed per day (each fed ad libitum:) | | |
| Milo grain | 12.5 | 16.8 |
| Liquid supplement | 1.1 | 1.8 |
| Alfalfa-Brome hay | 3.6 | 6.3 |
| Minerals | 1.0 | .95 |
| Pounds of feed required per pound of gain | 5.25 | 8.1 |

Thus, the animals fed with normal propyl alcohol had a slightly better daily gain and made decidedly more efficient use of ingested food. The animals fed normal propyl alcohol carried a more full rumen at all times and appeared to be more contented than the other bulls.

EXAMPLE 7

A supplement was prepared as follows:

| | Percent |
| --- | --- |
| Normal propyl alcohol | 12 |
| Water | 50 |
| Sucrose | 33 |
| Monosodium phosphate | 4.0 |
| Carboxymethyl cellulose (Hercules 7–LP) | 1.0 |

This hazy but good solution had a pH of 4.8, a viscosity of 40 centipoises at 120° F. and showed adequate adhesion on a glass rod at 120° F.

This supplement is a highly purified type which is useful for nutritional studies where one desires to feed the most normal propyl alcohol with a medium amount of sucrose and gum, and a low amount of acidulating agent. Maximum water is employed.

EXAMPLE 8

A supplement was prepared as follows:

| | Percent |
| --- | --- |
| Normal propyl alcohol | 12 |
| Water | 34 |
| Adhesive agent | 32 |
| Viscidizing agent | 2 |
| Acidulating agent | 18 |

The formula used was:

| | Percent |
| --- | --- |
| Normal propyl alcohol | 12 |
| Water, additional | 15 |
| Cane molasses | 68 |
| 80% phosphoric acid solution | 5 |
| | 100 |

The molasses contained 48% sugars, 3% unidentified substance, 26% water, 3% dextran, and 20% inorganic minerals, amino acids and other ionizable substances. The pH of this example was 3.35, the viscosity was 71.7 at 120° F., and the adhesive properties were quite sufficient. The color was a medium brown.

EXAMPLE 9

A liquid feed supplement was prepared as follows:

| | Percent |
| --- | --- |
| Normal propyl alcohol | 4 |
| Beet molasses | 84 |
| Added dextran | 2 |
| Monosodium phosphate | 10 |
| | 100 |

The molasses was obtained after partial removal of glutamic acid from Steffens process beet molasses. It contained only 25% of sugar and 38% water. The pH of this molasses was 3.2. The dextran gum content was none. This molasses contains large amounts of amino acids and mineral salts. Ionizable nutrients totalled 37% of the molasses. The viscosity was 400 centipoises at 78° F., the pH was 3.8, and the color was dark brown. The adhesive properties were satisfactory.

EXAMPLE 10

A pre-mix was made as follows:

| | Percent by weight |
|---|---|
| Normal propyl alcohol | 18 |
| Ethyl alcohol (SDA 35A) | 18 |
| Sodium chloride | 5 |
| 75% phosphoric acid | 9 |
| Water | 50 |

This pre-mix had a specific gravity of 1.004 and a pH of .8. It was a slightly hazy solution.

One part of this pre-mix was mixed with three parts of cane final molasses, 80° Brix, as purchased commercially, to make a finished product suitable for feeding to ruminants.

Five parts of urea were then added to ninety-five parts of the above stated finished product to produce a new urea-containing supplement, suitable for feeding to ruminants, whenever the co-fed ration contains less than 2% nitrogen (dry matter basis).

What is claimed is:

1. A liquid animal feed supplement containing at least one feed ingredient other than water and in addition as an essential active feed ingredient from about 1 to about 12 percent, by weight, of n-propyl alcohol effective to act as a source of hydrogen in the ration of the animal and thereby to contribute to the formation of the maximal amount of food for eventual human consumption.

2. A supplement in accordance with claim 1, which also contains at least one edible sugar selected from the group consisting of araginose, xylose, glucose, fructose, sucrose, maltose and lactose.

3. A supplement in accordance with claim 1, which also contains at least one edible gum selected from the group consisting of algin, amylopectin, arabic, carboxymethyl cellulose, dextran, dextrin, ethylhydroxyethyl cellulose, guar, karaya, methyl cellulose, methyl cellulose derivatives, pectin and carrageenan.

4. A supplement in accordance with claim 1, which also contains an ionizable compound naturally occurring in molasses in an amount sufficient to impart a pH between about 2.5 and 5.5 to the supplement.

5. A supplement in accordance with claim 1, which also contains from about 25 to 50 percent, by weight, of water, based on the total weight of the supplement.

6. A supplement in accordance with claim 1, which also contains up to about 22 percent, by weight, of ethyl alcohol, based on the total weight of the supplement.

7. A supplement in accordance with claim 1, which also contains urea.

8. A supplement in accordance with claim 1, which also contains phosphoric acid.

9. A supplement in accordance with claim 1, which also contains at least one edible sugar selected from the group consisting of arabinose, xylose, glucose, fructose, sucrose, maltose and lactose, at least one edible gum selected from the group consisting of algin, amylopectin, arabic, carboxymethyl cellulose, dextran, dextrin, ethylhydroxyethyl cellulose, guar, karaya, methyl cellulose, methyl cellulose derivatives, pectin and carrageenan, an ionizable compound naturally occurring in molasses in an amount sufficient to impart a pH between about 2.5 and 5.5 to the supplement and from about 25 to 50 percent, of water, the percents being by weight, based on the total weight of supplement.

10. A supplement in accordance with claim 1, which also contains from about 20 to about 70 percent of at least one edible sugar selected from the group consisting of arabinose, xylose, glucose, fructose, sucrose, maltose and lactose, from about ¼ to 8 percent of at least one edible gum selected from the group consisting of algin, amylopectin, arabic, carboxymethyl cellulose, dextran, dextrin, ethylhydroxyethyl cellulose, guar, karaya, methyl cellulose, methyl cellulose derivatives, pectin and carrageenan, an ionizable compound naturally occurring in molasses in an amount sufficient to impart a pH between about 2.5 and 5.5 to the supplement, and from about 25 to 50 percent of water, the amounts being by weight, based on the total weight of the supplement.

11. A liquid animal feed supplement consisting essentially of the following:

| | Percent |
|---|---|
| Normal propyl alcohol | 6 |
| Ethanol | 6 |
| Phosphoric acid (75%) | 3 |
| Molasses (solids) | 50 |
| Water | 33⅓ |
| Sodium chloride | 1⅔ |

12. The improvement in the preparation of a liquid feed for animals, which comprises incorporating in an animal feed from about 1 to about 12 percent, by weight, of n-propyl alcohol effective to act as a source of hydrogen in the ration of the animal and thereby to contribute to the formation of the maximal amount of food for eventual human consumption.

13. The improvement as set forth in claim 12, wherein the following are also incorporated in the supplement: at least one edible sugar selected from the group consisting of arabinose, xylose, glucose, fructose, sucrose, maltose and lactose, at least one edible gum selected from the group consisting of algin, amylopectin, arabic, carboxymethyl cellulose, dextran, dextrin, ethylhydroxyethyl cellulose, guar, karaya, methyl cellulose, methyl cellulose derivatives, pectin and carrageenan, an ionizable compound naturally occurring in molasses in an amount sufficient to impart a pH between about 2.5 and 5.5 to the supplement and from about 25 to 50 percent of water, the percents being by weight, based on the total weight of the supplement.

14. The improvement as set forth in claim 10, wherein the following are also incorporated in the supplement: from about 20 to about 70 percent of at least one edible sugar selected from the group consisting of arabinose, xylose, glucose, fructose, sucrose, maltose and lactose, from about ¼ to 8 percent of at least one edible gum selected from the group consisting of algin, amylopectin, arabic, carboxymethyl cellulose, dextran, dextrin, ethylhydroxyethyl cellulose, guar, karaya, methyl cellulose, methyl cellulose derivatives, pectin and carrageenan, an ionizable compound naturally occurring in molasses in an amount sufficient to impart a pH between about 2.5 and 5.5 to the supplement, and from about 25 to 50 percent of water, the amounts being by weight, based on the total weight of the supplement.

15. A pre-mix for a feed supplement consisting essentially of:

| | Percent by weight |
|---|---|
| Normal propyl alcohol | 18 |
| Ethyl alcohol (SDA 35A) | 18 |
| Sodium chloride | 5 |
| 75% phosphoric acid | 9 |
| Water | 50 |

References Cited

UNITED STATES PATENTS

| 2,748,001 | 5/1956 | Anderson et al. | 99—2 |
| 3,329,504 | 7/1967 | Senyi | 99—9 |

(Other references on following page)

FOREIGN PATENTS 708,130  4/1965  Canada.

OTHER REFERENCES

Liquid Feed With Alcohol, reprint, Agricultural and Food Chemistry, vol 6, pp. 261–263, April 1958.

Morrison, Feeds and Feeding, Morrison Publishing Co., 22 ed., pp. 4, 89–90, 101-102 and 536, 1956.

Noller, Chemistry of Organic Compds., W. B. Saunders Co., p. 139, 1965.

A. LOUIS MONACELL, Primary Examiner

N. ROSKIN, Assistant Examiner

U.S. Cl. X.R.

424—343